US009560226B2

(12) United States Patent
Kikuta

(10) Patent No.: US 9,560,226 B2
(45) Date of Patent: Jan. 31, 2017

(54) COVER PORTION OF IMAGE READING APPARATUS AND IMAGE FORMING APPARATUS

(71) Applicant: KYOCERA Document Solutions Inc., Osaka-shi, Osaka (JP)

(72) Inventor: Tomoyuki Kikuta, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/868,227

(22) Filed: Sep. 28, 2015

(65) Prior Publication Data

US 2016/0094741 A1    Mar. 31, 2016

(30) Foreign Application Priority Data

Sep. 30, 2014    (JP) .................................. 2014-201134

(51) Int. Cl.
*H04N 1/00* (2006.01)

(52) U.S. Cl.
CPC ...... *H04N 1/00554* (2013.01); *H04N 1/00557* (2013.01); *H04N 1/00689* (2013.01); *H04N 1/00771* (2013.01)

(58) Field of Classification Search
CPC ............ H04N 1/00554; H04N 1/00689; H04N 1/00771; B41J 29/13
USPC ......... 358/3.32; 335/78, 164, 168, 170, 182, 335/192, 219; 399/380
See application file for complete search history.

(56) References Cited

U.S. PATENT DOCUMENTS

| 5,500,725 A | * | 3/1996 | Takasu | ................. G03G 15/607 250/559.24 |
| 2006/0227305 A1 | * | 10/2006 | Pee | ...................... G03G 15/605 355/18 |
| 2006/0288533 A1 | * | 12/2006 | Lee | .......................... E05F 5/02 16/330 |

FOREIGN PATENT DOCUMENTS

| JP | S56064559 A | 6/1981 |
| JP | S60262148 A | 12/1985 |
| JP | 2003302876 A | 10/2003 |
| JP | 2013093675 A | 5/2013 |

* cited by examiner

*Primary Examiner* — Jamares Q Washington
(74) *Attorney, Agent, or Firm* — Alleman Hall McCoy Russell & Tuttle LLP

(57) ABSTRACT

An image reading apparatus includes an apparatus body, a document sheet cover, a magnetic force generating portion, and a magnetic force control portion. The apparatus body has a document placement surface. The document sheet cover is supported by the apparatus body so as to be pivotable between an open position where the document placement surface is uncovered and a closed position where the document placement surface is covered with the document sheet cover. The magnetic force generating portion is able to selectively generate a magnetic attraction force and a magnetic repulsion force between a pair of a permanent magnet and an electromagnet provided in the cover portion and the apparatus body, respectively. The magnetic force control portion switches the magnetic force generating portion between a state where the magnetic force generating portion generates the attraction force and a state where the magnetic force generating portion generates the repulsion force.

6 Claims, 9 Drawing Sheets

COVER PORTION OF IMAGE READING APPARATUS AND IMAGE FORMING APPARATUS

INCORPORATION BY REFERENCE

This application is based upon and claims the benefit of priority from the corresponding Japanese Patent Application No. 2014-201134 filed on Sep. 30, 2014, the entire contents of which are incorporated herein by reference.

BACKGROUND

The present disclosure relates to an image reading apparatus having a cover portion for covering a document placement surface, and an image forming apparatus including the image reading apparatus.

An image reading apparatus having a cover portion provided above an apparatus body having a document placement surface, and an image forming apparatus including the image reading apparatus, such as a multifunction peripheral, have been well known. Usually, the cover portion is supported so as to be pivotable between an open position and a closed position, at a position on the back surface side of the apparatus body. The open position is a position where the document placement surface is uncovered, and the closed position is a position where the document placement surface is covered with the cover portion.

Before reading of an image of a document sheet is started, a user brings the cover portion to the closed position, with the document sheet being placed on the document placement surface. When the reading is completed, the user brings the cover portion to the open position and then takes the document sheet from the document placement surface.

In an image reading apparatus of a type having an automatic document feeder (ADF) mounted to the cover portion or a type usable for a large-size (e.g., A3 size) document sheet, the cover portion is heavy. In this case, it is difficult for a powerless user to perform the opening/closing operation of the cover portion as described above.

On the other hand, when the thickness of a document sheet is relatively large, the document sheet sometimes cannot be sufficiently pressed by the weight of the cover portion alone. Also when a document sheet has a fold, the document sheet cannot be sufficiently pressed by the weight of the cover portion alone, and a portion of the document sheet may rise up from the document placement surface. Furthermore, if the user fails to pay attention as to whether or not execution of image reading is completed, he/she may open the cover portion during reading of the document sheet. In such a case, it is troublesome for the user to continuously press the cover portion during the image reading while paying attention to completion of the image reading, in order to obtain a clear read image.

An object of the present disclosure is to provide an image reading apparatus capable of enhancing operability and convenience of a cover portion that covers a document placement surface, and an image forming apparatus including the image reading apparatus.

SUMMARY

An image reading apparatus according to an aspect of the present disclosure includes an apparatus body, a cover portion, a magnetic force generating portion, and a magnetic force control portion.

The apparatus body includes a document placement surface. The cover portion is supported by the apparatus body so as to be pivotable between an open position where the document placement surface is uncovered and a closed position where the document placement surface is covered with the cover portion. The magnetic force generating portion is able to selectively generate a magnetic attraction force and a magnetic repulsion force between a pair of opposing members provided in the cover portion and the apparatus body, respectively. The magnetic force control portion switches the magnetic force generating portion between a state where the magnetic force generating portion generates the attraction force and a state where the magnetic force generating portion generates the repulsion force.

An image forming apparatus according to another aspect of the present disclosure includes the above-mentioned image reading apparatus, and an image forming portion configured to form, on a sheet member, an image read by the image reading apparatus.

According to the present disclosure, it is possible to provide an image reading apparatus capable of enhancing operability and convenience of a cover portion that covers a document placement surface, and an image forming apparatus including the image reading apparatus.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

First Embodiment

Figure 1:
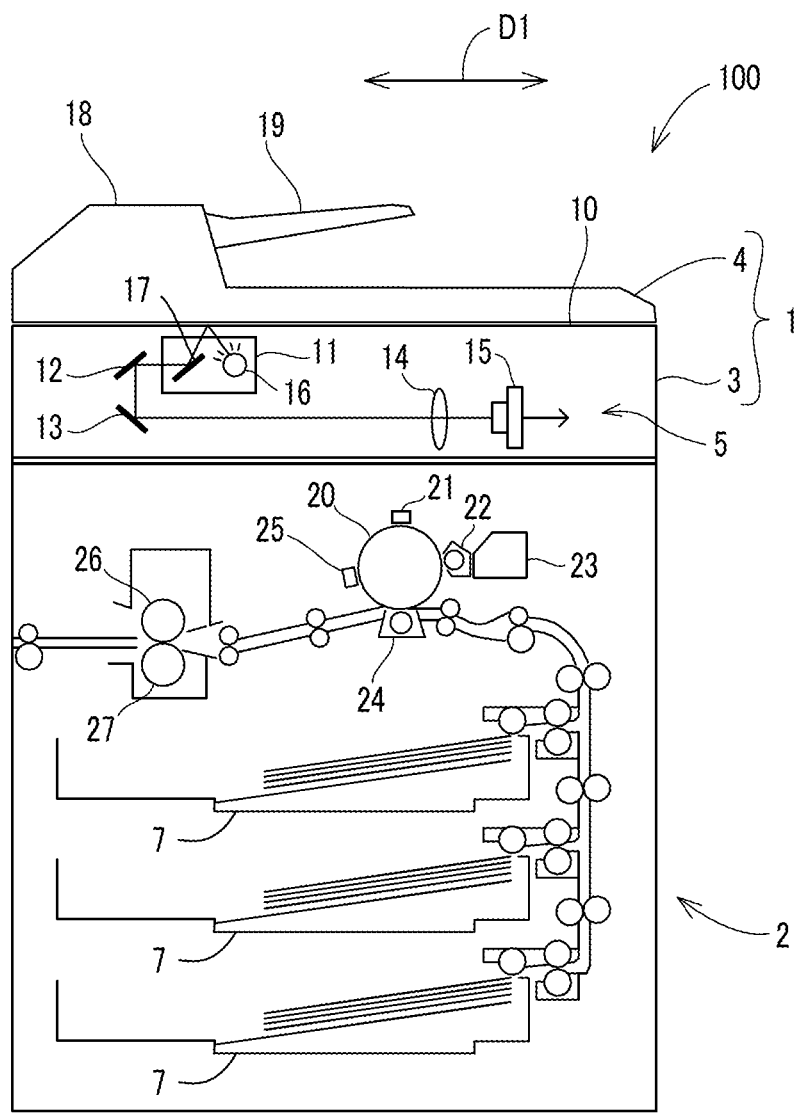
FIG. 1 is a configuration diagram showing an internal configuration of an image forming apparatus including an image reading apparatus according to a first embodiment of the present disclosure.
Figure 2:
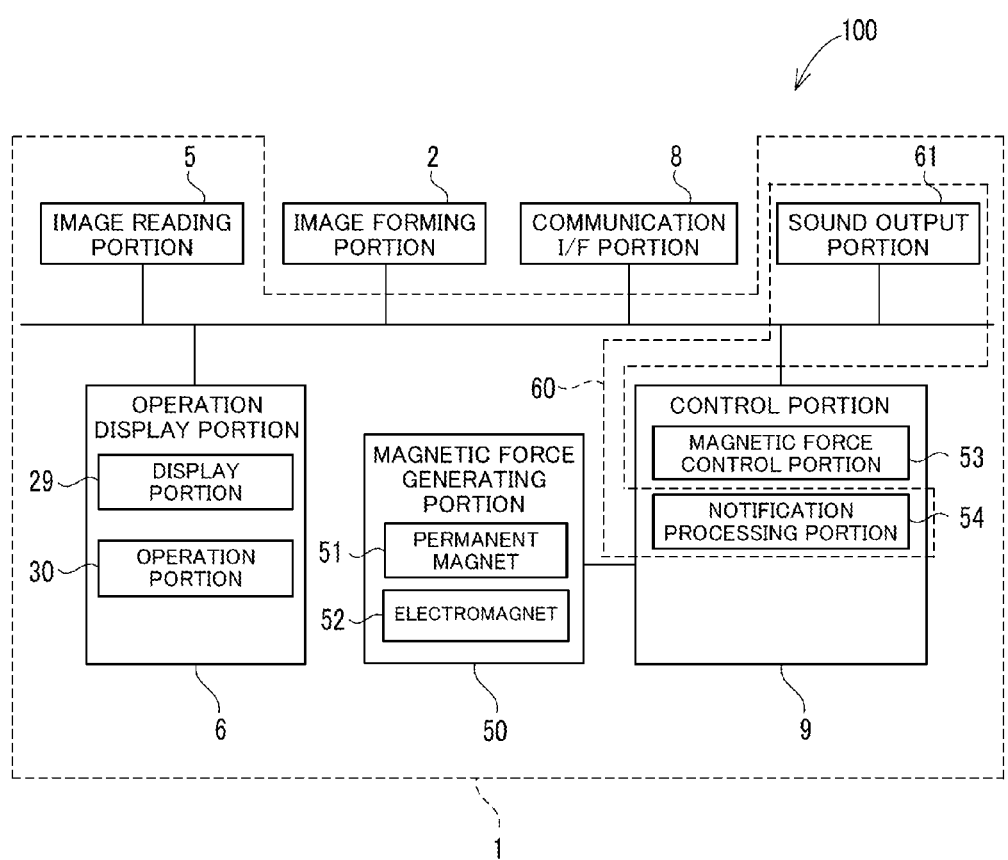
FIG. 2 is a block diagram showing a configuration of the image forming apparatus including the image reading apparatus according to the first embodiment of the present disclosure.

An image forming apparatus 100 according to a first embodiment of the present disclosure will be described with reference to FIG. 1 and FIG. 2.

The image forming apparatus 100 is a multifunction peripheral having an image reading function, a facsimile function, an image forming function, and the like. The image forming apparatus 100 is not limited to the multifunction peripheral, and may be a facsimile apparatus, a copying machine, or the like.

The image forming apparatus 100 includes an image reading apparatus 1 and an image forming portion 2. The image reading apparatus 1 includes an apparatus body 3 and a document sheet cover 4.

The apparatus body 3 includes an image reading portion 5 that executes a reading job for reading image data from a document sheet. The image reading portion 5 is provided with a contact glass 10, a reading unit 11, mirrors 12 and 13, an optical lens 14, a CCD 15, and the like. The contact glass 10 is provided on an upper surface of the apparatus body 3. An upper surface of the contact glass 10 is a document placement surface 10A (refer to FIG. 3(A)).

The reading unit 11 is provided below the contact glass 10. The reading unit 11 includes an LED light source 16 and a mirror 17. The reading unit 11 is configured to be movable in a sub scanning direction D1 by a movement mechanism (not shown) using a drive motor such as a stepping motor. The sub scanning direction D1 is a right-left direction in FIG. 1.

When light is emitted from the LED light source 16 and reflected at a document sheet placed on the document placement surface 10A, the mirror 17 reflects the reflected light toward the mirror 12. The CCD 15 is a photoelectric converter that receives the reflected light, and outputs an electric signal (voltage) according to the amount of the received light (intensity of brightness). The electric signal according to the amount of the received light is digitized and transmitted as light amount data to the control portion 9.

The image reading portion 5 reads an image of a document sheet in the following procedure.

A user places a document sheet on the contact glass 10, and brings the document sheet cover 4 to the closed position. Thereafter, the user performs an image reading start operation to an operation display portion 6.

When the image reading start operation has been started, the image reading portion 5 executes the reading job. In the reading job, the drive motor causes the reading unit 11, which is located at a predetermined home position, to move in the sub scanning direction D1. In parallel with the movement of the reading unit 11, the LED light source 16 continuously emits one line of light sequentially. Thereby, scanning in the sub scanning direction D1 is performed with the light emitted from the LED light source 16 toward the contact glass 10 provided on the upper surface of the apparatus body 3.

Then, the reflected light from the document sheet is guided to the CCD 15 through the mirrors 17, 12 and 13 and the optical lens 14, and the light amount data corresponding to the amount of the light received by the CCD 15 is sequentially transmitted to an image processing portion (not shown). The image processing portion processes the light amount data to generate image information of the document sheet from the light amount data.

Figure 3A:
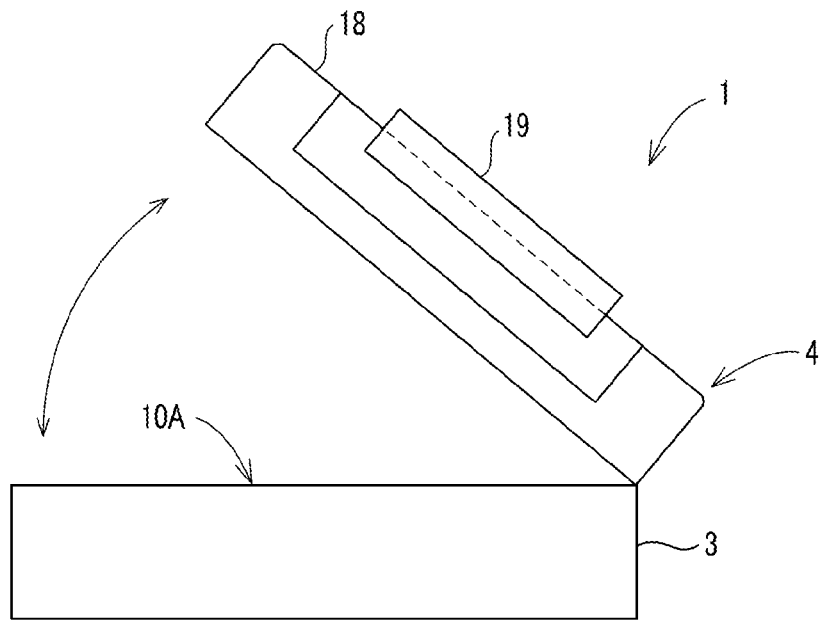
FIG. 3A is a diagram showing a document sheet cover at an open position.
Figure 3B:
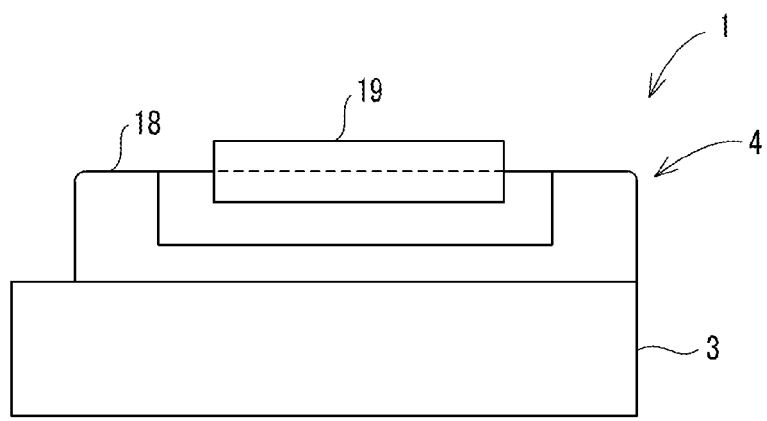
FIG. 3B is a diagram showing the document sheet cover at a closed position.
Figure 4:
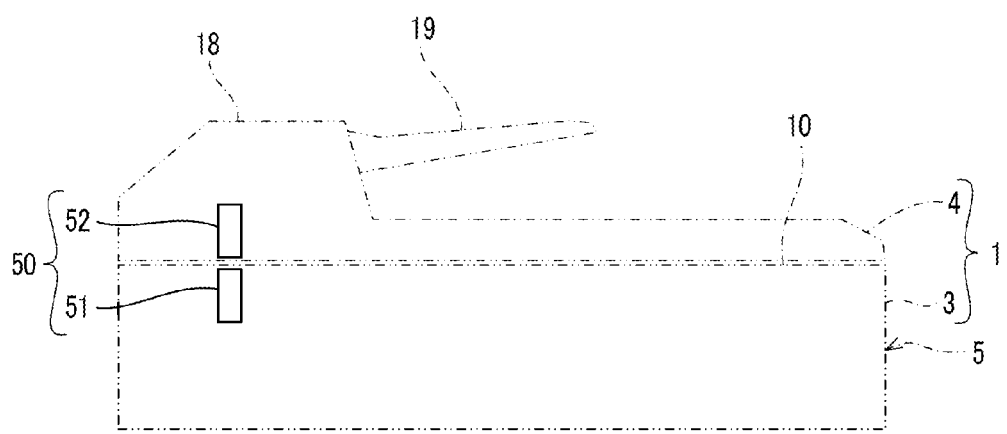
FIG. 4 is a diagram showing a configuration of a magnetic force generating portion.

The document sheet cover 4 is provided above the apparatus body 3. The document sheet cover 4 is supported by the apparatus body 3 so as to be pivotable between the open position and the closed position as shown in FIGS. 3A and 3B. The open position is a position where the document placement surface 10A is uncovered (refer to FIG. 3A). The closed position is a position where the document placement surface is covered with the document sheet cover 4 (refer to FIG. 3B).

The document sheet cover 4 is apart from the document placement surface 10A at the open position, and is close to the document placement surface 10A at the closed position. The document sheet cover 4, at the closed position, presses the document sheet placed on the document placement surface 10A so that the lower surface of the document sheet fits the document placement surface 10A, and blocks external light traveling toward the reading unit 11.

A rotation support portion of the document sheet cover 4 is provided with a cover open/close sensor (not shown) such as a limit switch. The cover open/close sensor outputs a cover detection signal to the control portion 9. The cover detection signal is a signal whose ON/OFF state is switched between when the document sheet cover 4 is at the open position and when the document sheet cover 4 is at a position closer to the open position relative to the closed position.

The result of detection by the cover open/close sensor is used as follows. For example, when the image reading start operation is performed, and then if the cover open/close sensor detects that the document sheet cover 4 is at the open position, execution of the reading operation by the image reading portion 5 is temporarily suspended, and the temporary suspension is notified.

Thereafter, when the cover open/close sensor detects that the document sheet cover 4 is at the closed position, the reading operation by the image reading portion 5 is executed.

When the image reading start operation is performed again even though the cover open/close sensor does not detect that the document sheet cover 4 is at the closed position, the reading operation by the image reading portion 5 is executed.

The document sheet cover 4 includes an ADF 18. The ADF 18 sequentially conveys document sheets, one by one, which are set in a document sheet setting portion 19, by a plurality of conveying rollers. Thereby, each document sheet passes through a document sheet reading position previously defined on the document placement surface 10A, in the sub scanning direction D1. When each document sheet is caused to move by the ADF 18, an image of the document sheet is read when the reading unit 11 stops at a position below the document sheet reading position.

The image forming portion 2 executes an image forming process (printing process) onto a recording sheet according to an electrophotographic method, based on the image information read by the image reading portion 5 or an image formation job. The image formation job is inputted from an external information processing apparatus such as a personal computer through a communication I/F portion 8 described later.

The image forming portion 2 includes sheet feed cassettes 7. In addition, the image forming portion 2 includes a photosensitive drum 20, a charging portion 21, a developing portion 22, a toner container 23, a transfer roller 24, an electricity removing portion 25, a fixing roller 26, and a pressure roller 27.

The image forming portion 2 performs the image forming process to the recording sheets supplied from the sheet feed cassette 7 in the following procedure.

When an image formation job including a printing instruction is inputted, the photosensitive drum 20 is uniformly charged at a predetermined potential by the charging portion 21. Next, based on the image information included in the image formation job, the output intensity of light applied from a laser scanning unit (LSU) to the surface of the photosensitive drum 20 is controlled.

Thereby, an electrostatic latent image is formed on the surface of the photosensitive drum 20. Then, the electrostatic latent image on the photosensitive drum 20 is developed (visualized) as a toner image by the developing portion 22. A toner (developer) is supplied from the toner container 23 to the developing portion 22.

Subsequently, the toner image formed on the photosensitive drum 20 is transferred onto the recording sheet by the transfer roller 24. Thereafter, the recording sheet passes between the fixing roller 26 and the pressure roller 27. At this time, the toner image transferred onto the recording sheet is melted and fixed by being heated by the fixing roller 26. The potential of the photosensitive drum 20 is removed by the electricity removing device 25.

The image forming apparatus 100 includes a communication I/F portion 8. The communication I/F portion 8 is an interface that executes data communication with an external apparatus. The external apparatus is connected to the image forming apparatus 100 via a communication network such as the Internet or a LAN.

The image reading apparatus 1 includes the operation display portion 6 and the control portion 9. The operation display portion 6 includes a display portion 29, and an operation portion 30.

The display portion 29 includes, for example, a color liquid crystal display or the like. The display portion 29 displays various kinds of information to a user who operates the operation display portion 6. The operation portion 30 includes one or a plurality of various push button keys disposed adjacent to the display portion 29, a touch panel sensor disposed on a display screen of the display portion 29, and the like. The operation portion 30 receives operations to input various kinds of instructions by the user of the image forming apparatus 100. When the operation display portion 6 receives, from the user, an operation of execution instruction for any process such as an image reading process, the operation display portion 6 outputs an operation signal corresponding to the operation to the control portion 9.

The control portion 9 includes a CPU, a ROM, and a RAM. The CPU is a processor that executes various calculation processes. The ROM is a non-volatile storage portion in which information such as a control program for causing the CPU to execute various processes is stored in advance. The RAM is a volatile storage portion used as a temporary storage memory (working area) for various processes executed by the CPU. The control portion 9 controls the operation of the image forming apparatus 100 by causing the CPU to execute the program stored in the ROM.

Figure 5:
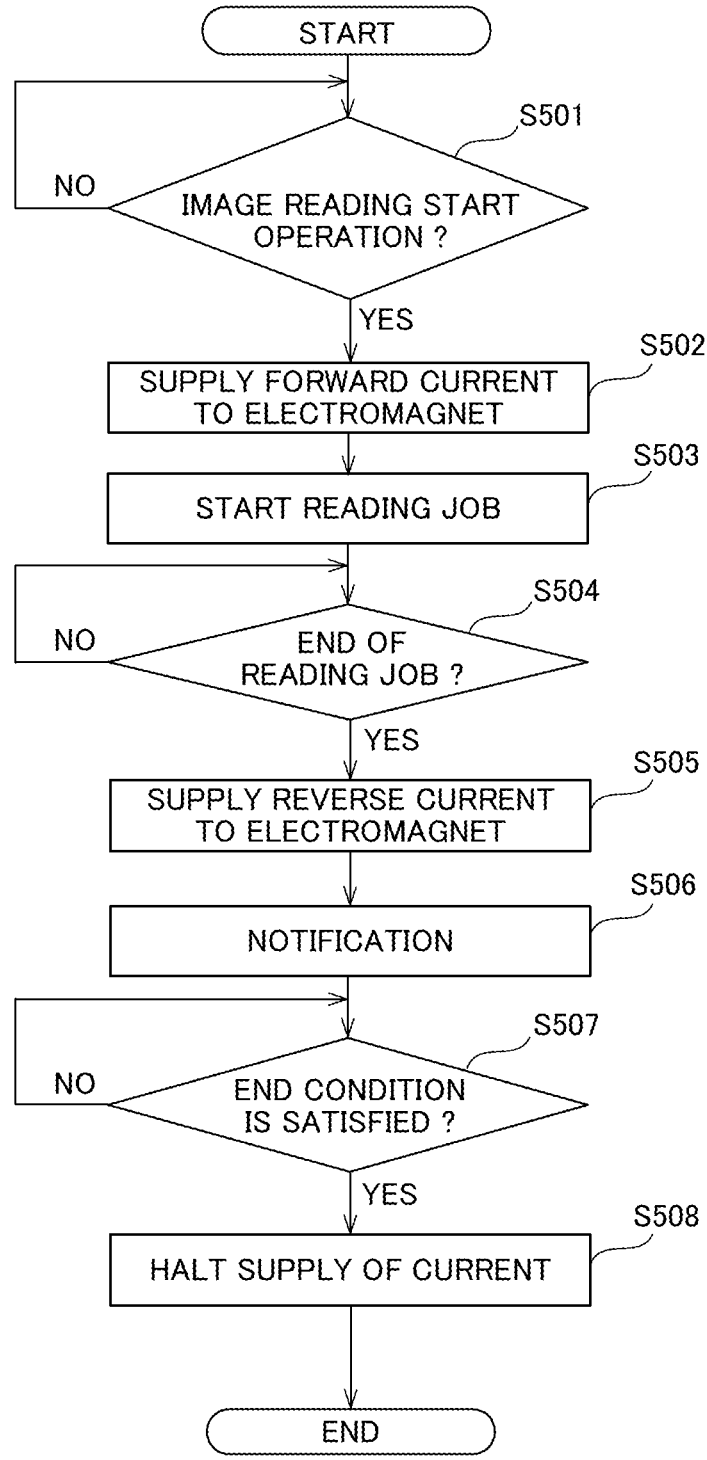
FIG. 5 is a flowchart showing processing performed by a control portion.

A processing program that causes the CPU of the control portion 9 to execute later-described processing is stored in the ROM of the control portion 9 (refer to a flowchart of FIG. 5 and the like for the later-described processing). The processing program may be stored in the ROM at the stage of shipment of the image forming apparatus 100. Alternatively, the processing program may be loaded from a non-transitory computer-readable storage medium to the ROM of the control portion 9 after the shipment. In this case, the processing program is stored in a non-transitory computer-readable storage medium such as a CD, a DVD, and a flash memory.

In the image reading apparatus of a type having the ADF 18 mounted to the document sheet cover 4 or a type usable for a large-size (e.g., A3 size) document sheet, the document sheet cover 4 is heavy. In this case, it is difficult for a powerless user to perform the opening/closing operation of the document sheet cover 4 as described above.

On the other hand, when the thickness of a document sheet is relatively large, the document sheet sometimes cannot be sufficiently pressed by the weight of the document sheet cover 4 alone. Also when a document sheet has a fold, the document sheet cannot be sufficiently pressed by the weight of the document sheet cover 4 alone, and a portion of the document sheet may rise up from the document placement surface 10A. Furthermore, if the user fails to pay attention as to whether or not execution of image reading is completed, he/she may open the document sheet cover 4 during reading of the document sheet. In such a case, it is troublesome for the user to continuously press the document sheet cover 4 during the image reading while paying attention to completion of the image reading, in order to obtain a clear read image.

Therefore, the image reading apparatus 1 has the following configuration to enhance operability and convenience of the document sheet cover 4.

The image reading apparatus 1 includes a magnetic force generating portion 50. The magnetic force generating portion 50 includes a permanent magnet 51 and an electromagnet 52. In the image forming apparatus 100 according to the present embodiment, the permanent magnet 51 is embedded in the apparatus body 3, and the electromagnet 52 is embedded in the document sheet cover 4. The permanent magnet 51 and the electromagnet 52 are disposed at positions opposed to each other when the document sheet cover 4 is at the closed position.

Further, in the present embodiment, the permanent magnet 51 is fixed to a predetermined portion of the apparatus body 3, and the electromagnet 52 is fixed to a predetermined portion of the document sheet cover 4. The magnetic force generating portion 50 selectively generates a magnetic attraction force and a magnetic repulsion force between the permanent magnet 51 and the electromagnet 52. The permanent magnet 51 and the electromagnet 52 correspond to a pair of opposing members of the magnetic force generating portion according to the present disclosure.

In the present embodiment, the electromagnet 52 is able to selectively generate a magnetic field attracting the permanent magnet 51 and a magnetic field repulsing the permanent magnet 51, in accordance with the direction of a supplied current. Thereby, the attraction force and the repulsion force between the permanent magnet 51 and the electromagnet 52 can be selectively generated. When no current is supplied to the electromagnet 52, neither an attraction force nor a repulsion force are generated between the permanent magnet 51 and the electromagnet 52.

The control portion 9 includes a magnetic force control portion 53. The magnetic force control portion 53 changes the direction of the current supplied to the electromagnet 52 according to need. Thereby, the magnetic force control portion 53 switches the magnetic force generating portion 50 between a first state where the magnetic force generating portion 50 generates the attraction force and a second state where the magnetic force generating portion 50 generates the repulsion force. The magnetic force control portion 53 may switch the magnetic force generating portion 50 to a state where the magnetic force generating portion 50 generates neither an attraction force nor a repulsion force. In this case, the magnetic force control portion 53 supplies no current to the electromagnet 52.

In the following description, a current supplied to the electromagnet 52 to set the magnetic force generating portion 50 in the first state is referred to as a forward current. On the other hand, a current supplied to the electromagnet 52 to set the magnetic force generating portion 50 in the second state is referred to as a reverse current.

The magnetic force control portion 53 supplies the forward current to the electromagnet 52 while a reading job is being executed, thereby to cause the magnetic force generating portion 50 to generate the attraction force. The reading job is a job for reading an image of a document sheet placed on the document placement surface 10A. The phrase "while a reading job is being executed" means at least a period of time from when the CCD 15 starts reception of light to when the CCD 15 ends the reception of light.

The magnetic force control portion 53 supplies the reverse current to the electromagnet 52 when the reading job has ended, thereby to cause the magnetic force generating portion 50 to generate the repulsion force. Thus, the document sheet cover 4 is separated from the apparatus body 3. In the present embodiment, the magnitude of the reverse current is large enough to cause a front-surface-side portion of the document sheet cover 4 to rise up by a predetermined amount from the apparatus body 3.

Further, the image forming apparatus 100 includes a notification portion 60. In the present embodiment, the notification portion 60 includes a sound output portion 61 and a notification processing portion 54. The notification processing portion 54 is provided in the control portion 9. When the reading job has ended, the notification processing portion 54 causes the sound output portion 61 to output a sound, thereby to notify the user of presence of the document sheet on the document placement surface 10A.

Next, processing performed by the control portion 9 will be described with reference to FIG. 5. In the flowchart in FIG. 5, S501, S502, . . . represent procedure (step) numbers.

<Step S501>

In step S501, the control portion 9 determines whether or not the image reading start operation has been performed through the operation portion 30. Upon determining that the image reading start operation has not been performed (NO in step S501), the control portion 9 executes the process in step S501 again. On the other hand, upon determining that the image reading start operation has been performed (YES in step S501), the control portion 9 proceeds to a process in step S502.

<Step S502>

In step S502, the magnetic force control portion 53 supplies the forward current to the electromagnet 52 to cause the magnetic force generating portion 50 to generate the attraction force. Thereby, the document sheet cover 4 is attracted to the apparatus body 3, and the document sheet cover 4 causes the document sheet placed on the document placement surface 10A to be in close contact with the document placement surface 10A. Then, the control portion 9 proceeds to step S503.

<Step S503>

In step S503, the control portion 9 starts the reading job. Then, the control portion 9 proceeds to step S504. The process in step S502 and the process in step S503 may be performed in reverse order, or may be performed at the same time.

<Step S504>

In step S504, the control portion 9 determines whether or not the reading job has ended. The control portion 9 repeats the process in step S504 according to need until determining that the reading job has ended. On the other hand, upon determining that the reading job has ended (YES in step S504), the control portion 9 proceeds to a step in step S505.

<Step S505>

When the reading job has ended, the magnetic force control portion 53 supplies the reverse current to the electromagnet 52 to cause the magnetic force generating portion 50 to generate the repulsion force (S505). Thereby, the document sheet cover 4 is separated from the apparatus body 3, and the front-surface-side portion of the document sheet cover 4 rises up by a predetermined amount from the apparatus body 3. The control portion 9 proceeds to step S506.

<Step S506>

When the reading job has ended, the notification processing portion 54 causes the sound output portion 61 to output a sound, thereby notifying the user of presence of the document sheet on the document placement surface 10A (S506). Thus, the user is prevented from forgetting to take the document sheet on the document placement surface 10A after the end of the reading job. The process in step S505 and the process in step S506 may be performed in reverse order, or may be performed at the same time.

<Step S507>

In step S507, the magnetic force control portion 53 determines whether or not an end condition to end supply of the reverse current to the electromagnet 52 is satisfied. For example, as the end condition, a condition that a predetermined time has elapsed from when supply of the reverse current to the electromagnet 52 is started, may be adopted.

Alternatively, as the end condition, a condition that the signal level of an output signal from the CCD 15 has changed by a predetermined amount or more with the LED light source 16 being turned off and the reading unit 11 being stopped at the document sheet reading position, may be adopted. When the document sheet cover 4 is lifted up and the document sheet is removed from the document placement surface 10A, the incident state of external light to the CCD 15 changes. The end condition based on the output signal from the CCD 15 is an example of a condition for detecting that an operation to remove the document sheet has been performed.

Upon determining that the end condition is not satisfied (NO in step S507), the magnetic force control portion 53 executes the process in step S507 again. On the other hand, upon determining that the end condition is satisfied (YES in step S507), the magnetic force control portion 53 proceeds to a process in step S508.

<Step S508>

In step S508, the magnetic force control portion 53 halts supply of the reverse current to the electromagnet 52. Thereby, the magnetic force control portion 53 switches the magnetic force generating portion 50 to the state where the magnetic force generating portion 50 generates neither the attraction force not the repulsion force.

When the magnetic force control portion 53 halts supply of the reverse current to the electromagnet 52, the magnetic force control portion 53 may instantaneously reduce the reverse current to zero, or may gradually reduce the reverse current. With the gradual reduction in the reverse current, the repulsion force is gradually reduced, and then the document sheet cover 4 is gradually displaced to the closed position due to its own weight. As a result, the document sheet cover 4 is prevented from being vigorously displaced to the closed position.

As described above, the image forming apparatus 100 includes the magnetic force generating portion 50 and the magnetic force control portion 53. The magnetic force control portion 53 causes the magnetic force generating portion 50 to generate the attraction force while the reading job is being executed, thereby to attract the document sheet cover 4 to the apparatus body 3.

Thus, even when the thickness of the document sheet is relatively large or the document sheet has a fold, the document sheet can be pressed onto the document placement surface 10A by the weight of the document sheet cover 4 and the attraction force caused by the magnetic force generating portion 50. Particularly when the document sheet has a fold, a portion of the document sheet is prevented from rising up from the document placement surface 10A.

Furthermore, the user is saved the trouble of, during execution of image reading, continuously pressing the document sheet cover 4 while paying attention to completion of the image reading, in order to obtain a clear read image.

Furthermore, in the present embodiment, the magnetic force control portion 53 causes the magnetic force generating portion 50 to generate the repulsion force when the reading job has ended. Thereby, the magnetic force control portion 53 causes the front-surface-side portion of the document sheet cover 4 to rise up by a predetermined amount from the apparatus body 3.

Thus, even a powerless user can easily perform the opening/closing operation of the heavy document sheet cover 4. In the image forming apparatus 100 of the type having the ADF 18 mounted to the document sheet cover 4 as in the present embodiment or an image forming apparatus of a type usable for a large-size document sheet, the document sheet cover 4 is heavy.

Thus, operability and convenience of the image forming apparatus 100 can be enhanced.

The magnetic force control portion 53 may cause the electromagnet 52 to generate a relatively large repulsion force by supplying a relatively large current as the reverse current to the electromagnet 52, thereby to shift the document sheet cover 4 to the open position. In this case, the user need not perform the operation to pivot the document sheet cover 4 to the open position, as compared to the case where the front-surface-side portion of the document sheet cover 4 rises up by a predetermined amount from the apparatus body 3. Thus, convenience of the image forming apparatus 100 is further enhanced.

Furthermore, in the above embodiment, the permanent magnet 51 is embedded in the apparatus body 3 of the image reading apparatus 1, and the electromagnet 52 is embedded in the document sheet cover 4. However, another embodiment is also adoptable in which the permanent magnet 51 is embedded in the document sheet cover 4 and the electromagnet 52 is embedded in the apparatus body 3.

Second Embodiment

An image forming apparatus 200 according to a second embodiment of the present disclosure includes the following components in addition to the components of the image forming apparatus 100 according to the first embodiment.

Figure 6:
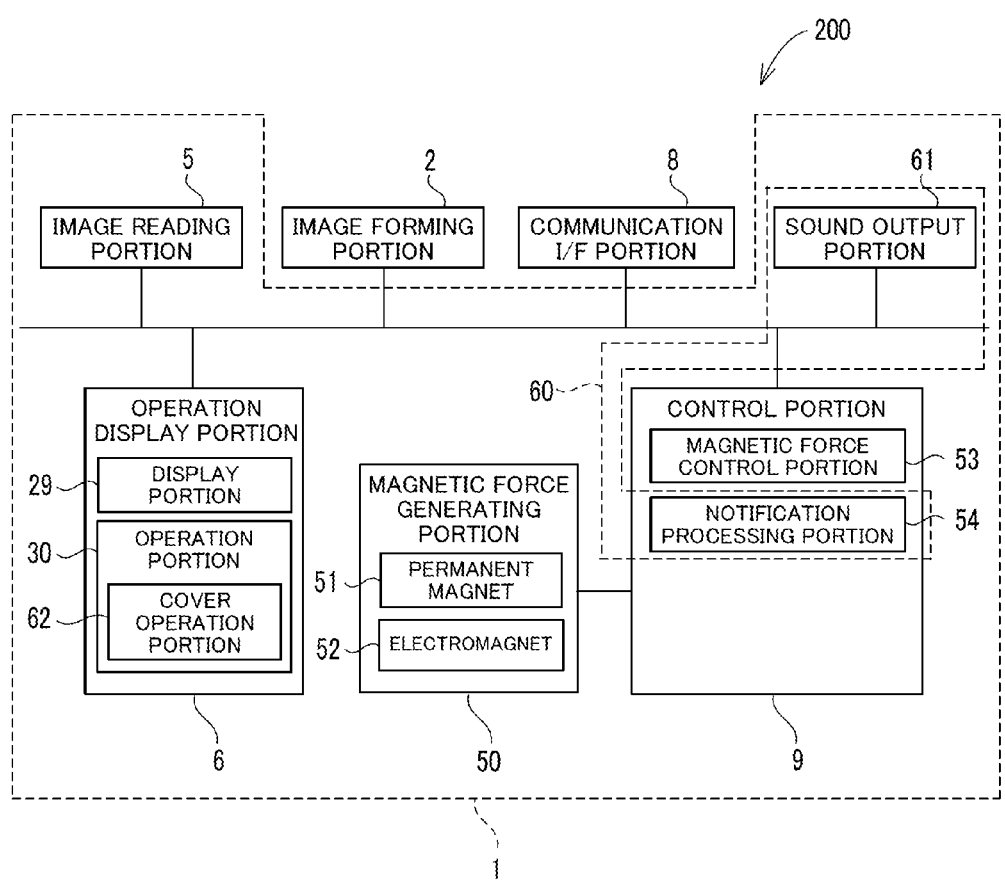
FIG. 6 is a block diagram showing a configuration of an image forming apparatus including an image reading apparatus according to a second embodiment.
Figure 7:
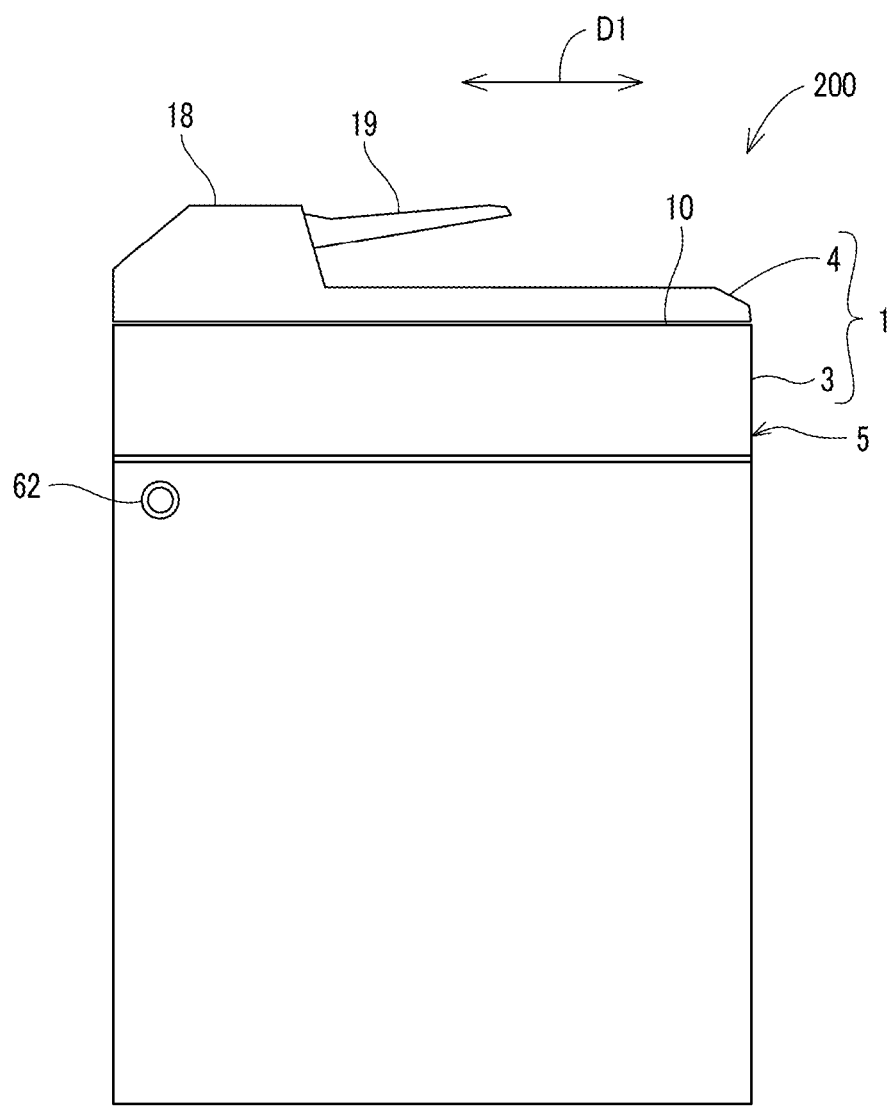
FIG. 7 is a diagram showing an outer appearance of the image forming apparatus including the image reading apparatus according to the second embodiment.

As shown in FIGS. 6 and 7, the operation display portion 6 of the image forming apparatus 200 according to the present embodiment includes a cover operation portion 62 such as a push button. The cover operation portion 62 is operated by a user. As shown in FIG. 7, the cover operation portion 62 is provided at an appropriate position in a housing of the image forming portion 2. An operation on the cover operation portion 62 is an example of a predetermined user operation of the present disclosure.

When an operation to press the cover operation portion 62 is performed, the magnetic force control portion 53 causes the magnetic force generating portion 50 to generate the repulsion force. The magnetic force control portion 53 causes the magnetic force generating portion 50 to maintain the generation of the repulsion force until, for example, the above-mentioned end condition is satisfied, and thereafter, halts supply of a current to the magnetic force generating portion 50.

With the above-mentioned configuration, the user is allowed to bring the document sheet cover 4 to the open position or the raising-up state, through the magnetic force generating portion 50, at a desired timing. The document sheet cover 4 at the rising-up position from the document placement surface 10A can be lifted up to the open position with less power, as compared to the document sheet cover 4 at the closed position. As a result, operability and convenience of the image forming apparatus 200 are enhanced.

The magnetic force generating portion 50 may generate the repulsion force in accordance with an operation performed to the cover operation portion 62, instead of generating the attraction force or the repulsion force in accordance with the state of the reading job.

Third Embodiment

In the first and second embodiments, the permanent magnet 51 is fixed to a predetermined portion of the apparatus body 3. However, the present disclosure is not limited to these embodiments, and may adopt an embodiment as follows.

Figure 8:
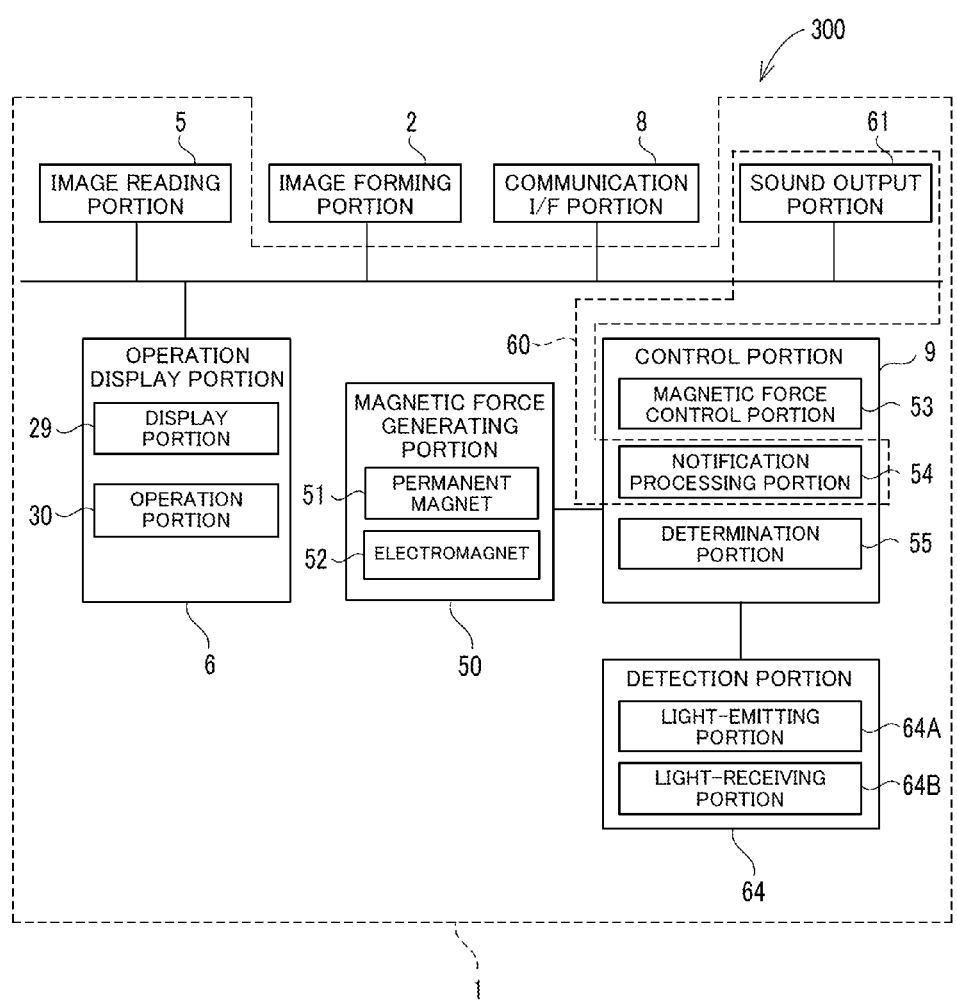
FIG. 8 is a block diagram showing a configuration of an image forming apparatus including an image reading apparatus according to a third embodiment.
Figure 9:
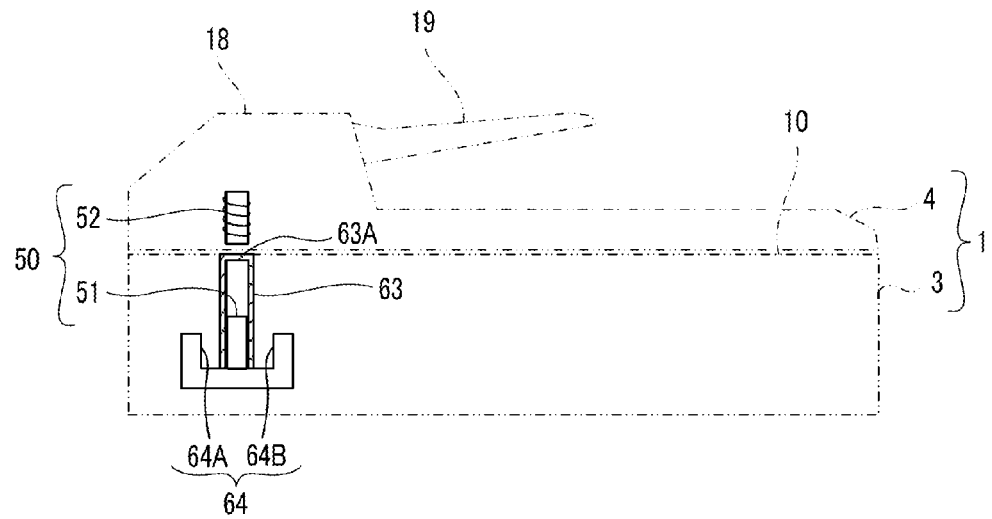
FIG. 9 is a diagram showing a configuration of a magnetic force generating portion according to the third embodiment.
Figure 10A:
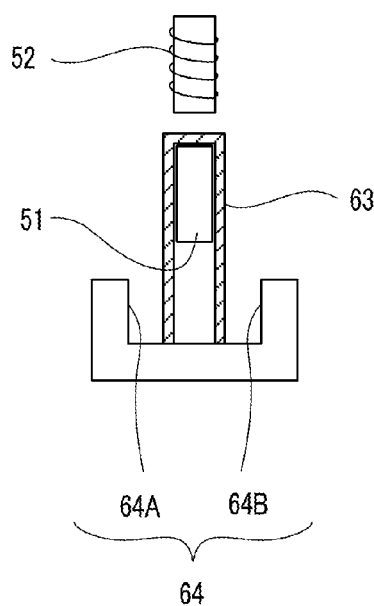
FIG. 10A is a diagram showing the magnetic force generating portion in a state where a permanent magnet is located at a first position.
Figure 10B:
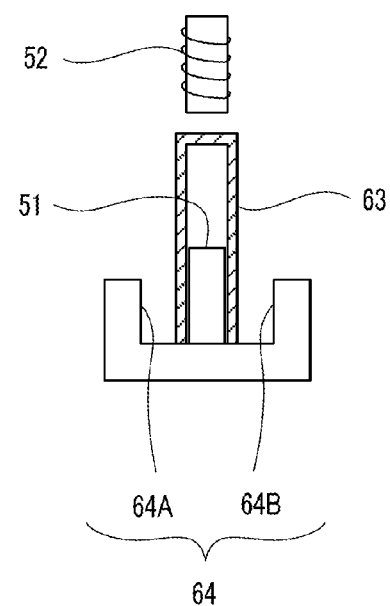
FIG. 10B is a diagram showing the magnetic force generating portion in a state where the permanent magnet is located at a second position.

As shown in FIGS. 8 to 10, an image forming apparatus 300 according to a third embodiment includes a guide portion 63, a detection portion 64, and a determination portion 55, in addition to the components of the first embodiment. The third embodiment is identical to the first embodiment in that the permanent magnet 51 is embedded in the apparatus body 3 of the image reading apparatus 1 and the electromagnet 52 is embedded in the document sheet cover 4.

The guide portion 63 is composed of a tubular member, for example. The permanent magnet 51 is movable in the guide portion 63. The guide portion 63 guides the permanent magnet 51 so that the permanent magnet 51 is displaceable between a first position opposing the electromagnet 52 and a second position lower than the first position by a predetermined amount, under the state where the document sheet cover 4 is at the closed position.

Under the state where the document sheet cover 4 is at the closed position, the permanent magnet 51 is located at the first position when the attraction force is generated between the permanent magnet 51 and the electromagnet 52, and otherwise, the permanent magnet 51 is located at the second position. At an upper end of the guide portion 63, a restricting portion 63A is provided which restricts movement of the permanent magnet 51 toward the document sheet cover 4 side over the first position. Thereby, the document sheet cover 4 is attracted to the apparatus body 3 by the attraction force generated by the magnetic force generating portion 50.

As shown in FIGS. 9 and 10, in the present embodiment, the detection portion 64 detects the state where the permanent magnet 51 is located at the second position. The detection portion 64 is a photointerrupter. The detection portion 64 shown in FIGS. 9 and 10 is a light transmitting photointerrupter. The photointerrupter includes a light-emitting portion 64A and a light-receiving portion 64B which are opposed to each other at a predetermined interval. The permanent magnet 51, when located at the second position, is located in a gap between the light-emitting portion 64A and the light-receiving portion 64B.

The signal level of a signal outputted from the light-receiving portion 64B varies between the case where light emitted from the light-emitting portion 64A is blocked by the permanent magnet 51 and the case where the light is received by the light-receiving portion 64B because of absence of the permanent magnet 51 in the gap. In the present embodiment, when the light emitted from the light-emitting portion 64A is blocked by the permanent magnet 51, an L (low) signal is outputted from the light-receiving portion 64B.

On the other hand, when the light is received by the light-receiving portion 64B because of absence of the permanent magnet 51 in the gap, a H (high) signal is outputted from the light-receiving portion 64B. The signal outputted from the light-receiving portion 64B is outputted to the control portion 9 as an output signal from the detection portion 64.

When the forward current is supplied to the electromagnet 52 and thereby the magnetic force generating portion 50 is generating the attraction force, the determination portion 55 determines whether the document sheet cover 4 is at the open position or the closed position, based on the result of the detection by the detection portion 64.

That is, when the H (high) signal is outputted from the detection portion 64 in the state where the magnetic force generating portion 50 is generating the attraction force, the determination portion 55 determines that the document sheet cover 4 is at the closed position. On the other hand, when the L (low) signal is outputted from the detection portion 64 in the state where the magnetic force generating portion 50 is generating the attraction force, the determination portion 55 determines that the document sheet cover 4 is not at the closed position.

By adopting the above configuration, the cover open/close sensor is dispensed with.

In the present embodiment, the detection portion is provided which detects that the permanent magnet 51 is at the second position. However, the present disclosure is not limited to this embodiment. That is, another detection portion which detects that the permanent magnet 51 is at the first position may be further provided. Alternatively, one of the detection portion which detects that the permanent magnet 51 is at the first position and the detection portion which detects that the permanent magnet 51 is at the second position may be provided.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading apparatus comprising:
an apparatus body having a document placement surface;
a cover portion supported by the apparatus body so as to be pivotable between an open position where the document placement surface is uncovered and a closed position where the document placement surface is covered with the cover portion;
a magnetic force generating portion configured to selectively generate a magnetic attraction force and a magnetic repulsion force between a pair of opposing members provided in the cover portion and the apparatus body, respectively;
a magnetic force control portion configured to switch the magnetic force generating portion between a state where the magnetic force generating portion generates the attraction force and a state where the magnetic force generating portion generates the repulsion force;
a guide portion configured to guide a permanent magnet along a vertical direction, the permanent magnet provided in the apparatus body so that the permanent magnet is displaceable between a first position opposing an electromagnet fixed to the cover portion and a second position lower than the first position;
a detection portion configured to detect that the permanent magnet is located at at least one of the first position and the second position, the detection portion includes a light-emitting portion and a light-receiving portion, light emitted from the light-emitting portion is not blocked by the permanent magnet located at the first position, and light emitted from the light-emitting portion is blocked by the permanent magnet located at the second position; and
a determination portion configured to determine whether the cover portion is at the open position or the closed position, based on a result of the detection of the detection portion, when the magnetic force generating portion is generating the attraction force; wherein
the pair of opposing members of the magnetic force generating portion are the permanent magnet and the electromagnet, respectively, and
the magnetic force control portion switches the magnetic force generating portion between the state where the magnetic force generating portion generates the attraction force and the state where the magnetic force generating portion generates the repulsion force, by changing a direction of a current supplied to the electromagnet.

2. The image reading apparatus according to claim 1, wherein the magnetic force control portion causes the magnetic force generating portion to generate the repulsion force when a reading job of reading an image of a document sheet placed on the document placement surface has ended.

3. The image reading apparatus according to claim 1, wherein the magnetic force control portion causes the magnetic force generating portion to generate the attraction force when a reading job of reading an image of a document sheet placed on the document placement surface is being executed.

4. The image reading apparatus according to claim 1, wherein the magnetic force control portion causes the magnetic force generating portion to generate the repulsion force when a predetermined user operation has been performed.

5. The image reading apparatus according to claim 2 further comprising a notification portion configured to notify, by a sound, presence of the document sheet on the document placement surface when the reading job of reading the image of the document sheet placed on the document placement surface has ended.

6. An image forming apparatus comprising:
   the image reading apparatus according to claim 1; and
   an image forming portion configured to form an image read by the image reading apparatus.

* * * * *